(12) United States Patent
Matsumoto et al.

(10) Patent No.: US 8,037,901 B2
(45) Date of Patent: Oct. 18, 2011

(54) SOLENOID VALVE HAVING A HOLLOW CAP MOUNTED ON A LEADING END OF A MOVABLE IRON CORE

(75) Inventors: Takumi Matsumoto, Tsukubamirai (JP); Masaru Narita, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 747 days.

(21) Appl. No.: 12/128,357

(22) Filed: May 28, 2008

(65) Prior Publication Data
US 2008/0308760 A1    Dec. 18, 2008

(30) Foreign Application Priority Data
Jun. 18, 2007    (JP) .................................. 2007-159974

(51) Int. Cl.
*F16K 31/02*    (2006.01)
(52) U.S. Cl. ......... 137/625.65; 137/625.27; 251/129.19; 251/129.2; 251/337
(58) Field of Classification Search ............. 137/625.65, 137/625.27; 251/129.15, 129.19, 129.2, 251/337
See application file for complete search history.

(56) References Cited

U.S. PATENT DOCUMENTS

| 6,390,445 | B2 * | 5/2002 | Fukano ................. 251/129.19 |
| 6,542,059 | B2 | 4/2003 | Sato et al. |
| 6,655,411 | B2 | 12/2003 | Sato et al. |
| 6,745,790 | B2 * | 6/2004 | Sato et al. ............. 137/315.03 |
| 2006/0108551 | A1 * | 5/2006 | Yoshimura et al. ...... 251/129.15 |

FOREIGN PATENT DOCUMENTS

| JP | 2002-188749 A | 7/2002 |
| JP | 2003-56740 A | 2/2003 |
| JP | 2004-156709 | 6/2004 |
| TW | 500888 | 9/2002 |
| TW | 531617 | 5/2003 |

OTHER PUBLICATIONS

U.S. Appl. No. 12/129,899, filed May 30, 2008, Matsumoto.
Office Action issued Apr. 20, 2011, in Taiwan Patent Application No. 097121548.

* cited by examiner

*Primary Examiner* — John Bastianelli
(74) *Attorney, Agent, or Firm* — Oblon, Spivak, McClelland, Maier & Neustadt, L.L.P.

(57) ABSTRACT

A solenoid valve that is constructed as follows: a cap is mounted on a movable iron core such that forward movement thereof is restricted; a pressing member is displaceably arranged between abutting seat surfaces of the cap and the movable iron core; biasing forces F1, F2, and F3 of an iron core return spring for biasing the movable iron core toward a initial position, a cushioning spring provided between the movable iron core and the pressing member, and a valve return spring for biasing a valve member in a direction to open a valve are set so as to be F1>F2>F3; and gaps x and y are provided between the pressing member and the movable iron core and between the pressing member and the cap, respectively, when the movable iron core is at the initial position.

3 Claims, 4 Drawing Sheets

SOLENOID VALVE HAVING A HOLLOW CAP MOUNTED ON A LEADING END OF A MOVABLE IRON CORE

TECHNICAL FIELD

The present invention relates to a solenoid valve of a type that opens and closes a valve member in a direct-acting manner by using a movable iron core of a solenoid operation portion.

BACKGROUND ART

A solenoid valve of a type that opens and closes a valve member in a direct-acting manner by using a movable iron core of a solenoid operation portion is known, as is disclosed, for example, in Japanese Unexamined Patent Application Publication No. 2004-156709.

A solenoid valve of this type generally comprises a fixed iron core and a movable iron core that adhere to each other by a magnetic force generated by energizing an exciting coil, a poppet-type valve member that attaches to and detaches from a valve seat by an action of the movable iron core to close and open a flow path, an iron core return spring that biases the movable iron core toward an initial position (a valve-closing position at which the valve member abuts on the valve seat) at which the movable iron core is detached from the fixed iron core, and a valve return spring that biases the valve member in a direction in which the valve member detaches from the valve seat.

The solenoid valve is constructed such that, when the exciting coil is not energized, the movable iron core is detached from the fixed iron core by a biasing force of the iron core return spring, and the valve member is pressed against the valve seat via the movable iron core to close the flow path. The solenoid valve is also constructed such that, if the exciting coil is energized, since the movable iron core adheres to the fixed iron core and the biasing force of the iron core return spring no longer acts on the valve member, the valve member is detached from the valve seat by a biasing force of the valve return spring to open the flow path.

However, if the solenoid valve is switched from a valve-opening state in which the exciting coil is energized and the iron core return spring is compressed by the movable iron core to the valve-closing state by turning off the energization to the exciting coil, the movable iron core detaches from the fixed iron core at high velocity, causing the valve member to hit the valve seat with high impact by a inertial force of the movable iron core. Thus, there is a problem that the valve member is easily worn away. Also, there is another problem that a transmission member (a pushrod) provided between the movable iron core and the valve member to transmit an acting force of the movable iron core to the valve member is easily worn away.

DISCLOSURE OF INVENTION

It is therefore an object of the present invention to address the above-described known problems of a solenoid valve and reduce wear of a valve member and a transmission member to increase durability as well as responsivity.

To this end, the solenoid valve according to the present invention is constructed by arranging, along a valve axis, a fixed iron core and a movable iron core assembly that adhere to each other by a magnetic force generated by energizing a exciting coil, a valve seat formed in a flow path, a valve member to open and close the flow path by detaching from and attaching to the valve seat with an action of the movable iron core, and a transmission member to transmit an acting force of the movable iron core assembly to the valve member.

The movable iron core assembly comprises a movable iron core for adhering to the fixed iron core, a hollow cap mounted at a leading end of the movable iron core such that a forward movement thereof relative to the movable iron core is restricted, and a pressing member that fits into an interior of the cap so as to be forwardly and backwardly movable between a position where it abuts on the cap and a position where it abuts on the movable iron core and operates so as to press the valve member against the valve seat via the transmission member.

The cap is biased by an iron core return spring in a direction in which the movable iron core detaches from the fixed iron core. Between the movable iron core and the pressing member, a cushioning spring is provided to bias the movable iron core and the pressing member in mutually detaching directions. The valve member is biased by a valve return spring in a direction in which the valve member detaches from the valve seat. Biasing forces F1, F2, and F3 of the iron core return spring, the cushioning spring, and the valve return spring are related to each other so as to be F1>F2>F3.

The solenoid valve according to the present invention is also constructed such that when the movable iron core assembly occupies an initial position by the biasing force of the iron core return spring as the exciting coil is not energized, and the pressing member presses the valve member against the valve seat via the transmission member, gaps exists between the pressing member and the movable iron core and between the pressing member and the cap.

In this invention, the movable iron core has a flange portion at an outer circumference of the leading end thereof for locking. The cap has an iron core fitting bore into which the movable iron core fits, an iron core locking portion at which the flange portion of the movable iron core is locked, a pressing member housing in which the pressing member is housed, and abutting seat surfaces formed on the pressing member housing on which the pressing member abuts, in an interior thereof, and a spring sheet for the iron core return spring, at an outer circumference of a leading end thereof. In addition, it is desirable that the pressing member is disk-shaped and has abutting shoulders that abut on the abutting seat surfaces.

Also, projections and engaging grooves that engage each other to work as a rotation-preventing function may be provided on a side surface of the pressing member and a bore wall of the cap.

In this invention, the pressing member housing of the cap may be oval-shaped, the abutting seat surfaces and the engaging grooves may be formed at minor axially opposing positions on a sidewall of the pressing member housing, the pressing member may be formed such that a diameter thereof is shorter than a minor axial bore diameter of the pressing member housing, and the abutting shoulders and the projections may be formed at diametrically opposite positions on the pressing member.

Since the described solenoid valve of the present invention is constructed such that biasing forces F1, F2, and F3 of the iron return spring, the cushioning spring, and the valve return spring are related to each other so as to be F1>F2>F3 and gaps exist between the pressing member and the movable iron core and between the pressing member and the cap when the movable iron core assembly is at the initial position, if the movable iron core assembly is shifted from a working position at which the exciting coil is energized to the initial position by turning off the energization to the exciting coil, the acting force of the movable iron core that detaches from the fixed iron core by the biasing force of the iron core return spring acts on the transmission member via the cushioning spring and the pressing member, making the valve member abut on the valve seat while compressing the cushioning spring.

As a result, since an inertial force of the movable iron core is absorbed by compressing the cushioning spring, the valve member does not hit the valve seat hard and the pressing member does not abut on the transmission member with high impact, resulting in reduced wear and increased durability of the valve member and the transmission member.

Also, when the movable iron core assembly is shifted from the initial position to the working position by energizing the exciting coil, the cushioning spring being compressed presses the movable iron core toward the fixed iron core to assist an attracting behavior, resulting in quick and easy initial movement of the movable iron core as well as improved responsiveness.

BEST MODE FOR CARRYING OUT THE INVENTION

Figure 1:
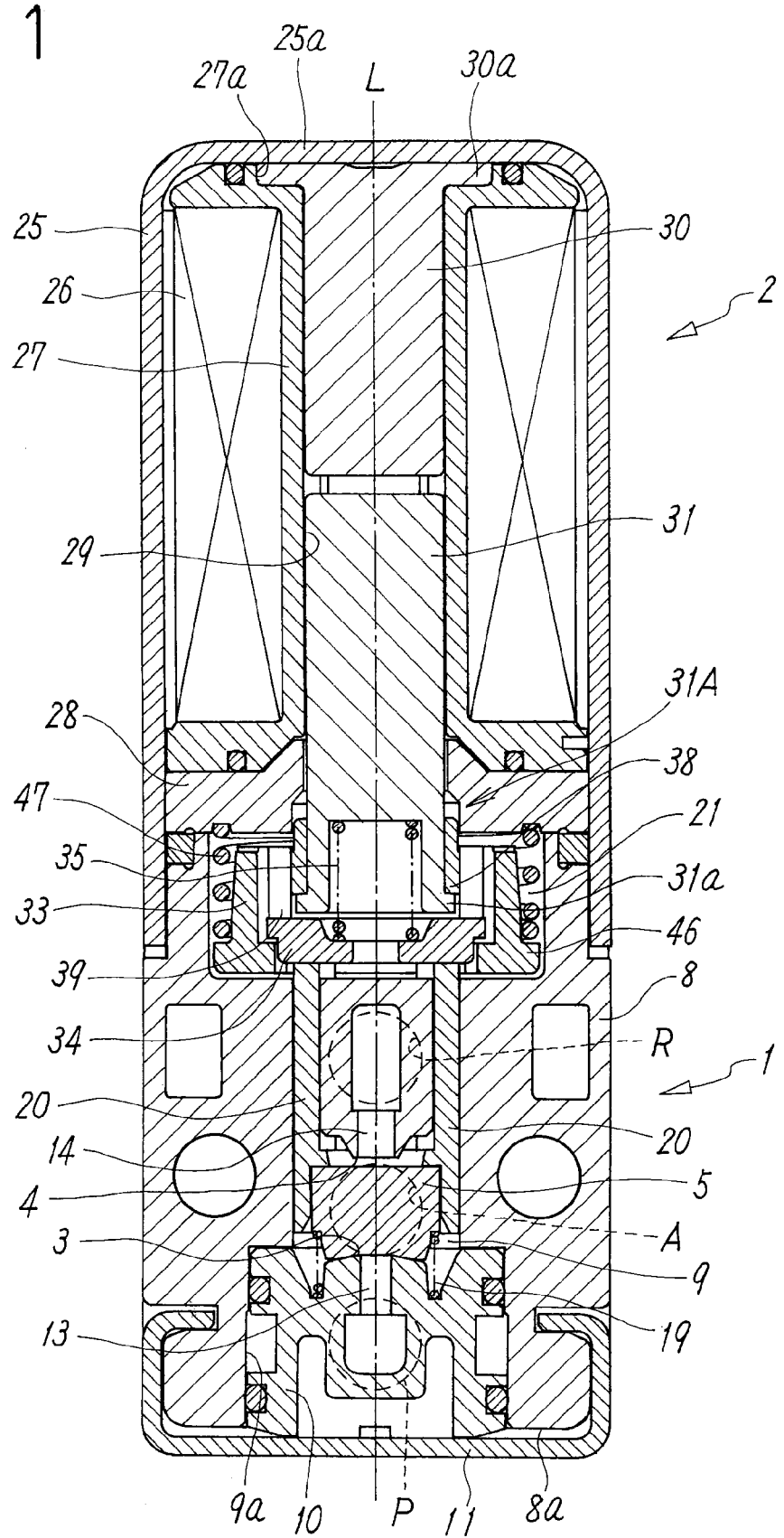
FIG. 1 is a cross-sectional view of an embodiment of the solenoid valve according to the present invention.

In FIG. 1, a three-port solenoid valve is shown as an exemplary embodiment of the solenoid valve according to the present invention. This solenoid valve comprises a main valve portion 1 having a poppet-type valve member 5 that detaches from and attaches to two valve seats 3 and 4 to open and close a flow path, and a solenoid operation portion 2 for operating the valve member 5, the main valve portion 1 and the solenoid operation portion 2 being associated in tandem along a valve axis L that is a central axis of the solenoid valve.

The main valve portion 1 has a valve body 8 made of a substantially square block, the block having a supply port P, an output port A, and an exhaust port R formed on one side surface thereof. In the valve body 8, a circular bore 9a that forms a valve chamber 9 is provided so as to extend from an end surface 8a, opposite the end surface with which the solenoid operating portion 2 is associated, into the interior of the valve body 8. A circular valve seat block 10 is attached to the bore 9a and fixed to the interior of the bore 9a by a fastener 11 mounted to the end surface 8a. In the interior of the valve chamber 9 defined in the bore 9a by the valve seat block 10, the valve member 5 is provided so as to be reciprocally movable along the valve axis L.

Figure 2:
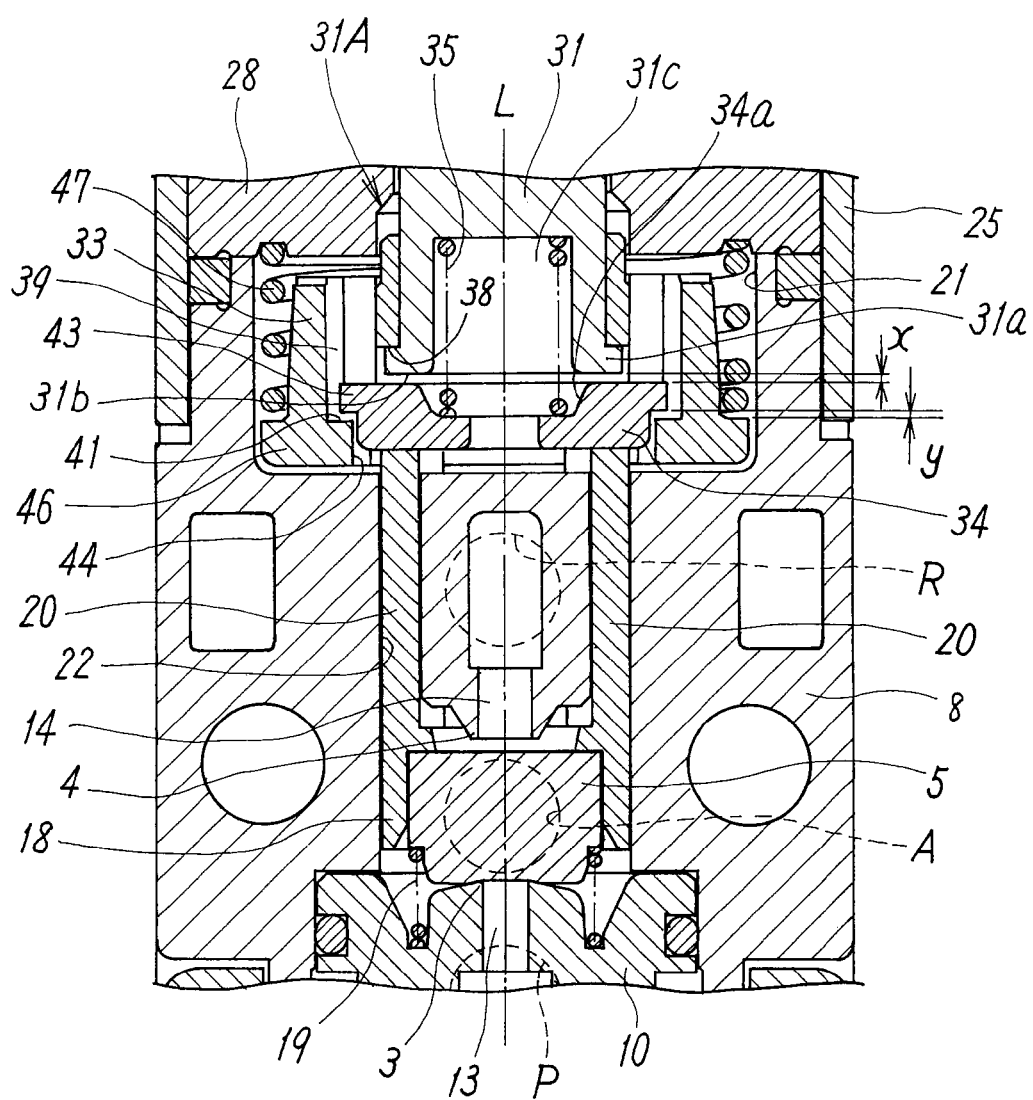
FIG. 2 is an enlarged view of the essential parts of FIG. 1.

As also seen from FIG. 2, on the valve seat block 10, a supply flow path 13 for allowing the supply port P to communicate with the valve chamber 9 is formed. In the valve body 8, an exhaust flow path 14 for allowing the exhaust port R to communicate with the valve chamber 9 is formed. A supply valve seat 3 formed around an opening of the supply flow path 13 and a exhaust valve seat 4 formed around an opening of the exhaust flow path 14 are arranged on the valve axis L and occupy opposing positions in the valve chamber 9. Between the valve seats 3 and 4, the valve member 5 is displaceably provided. Also, an output flow path for allowing the output port A to communicate with the valve chamber 9 opens in a sidewall of the valve chamber 9.

The valve member 5, a short columnar member made of rubber or synthetic rubber, is held by a cylindrical synthetic resin valve holder 18 by being fitted into the valve holder 18 and biased toward the exhaust valve seat 4 by a biasing force of a valve return spring 19 provided between the valve member 5 and the valve seat block 10. On left and right side surfaces of the valve holder 18, a pair of parallel pushrods 20 extending in a direction of the valve axis L is integrally provided as transmission members to transmit an acting force from the solenoid operating portion 2 to the valve member 5. The leading ends of the pushrods 20 extend through rod bores 22 formed on the valve body 8 into the interior of an iron core chamber 21 formed between the valve body 8 and the solenoid operating portion 2. The iron core chamber 21 is formed in a concave portion provided in the valve body 8.

In FIG. 1, the solenoid operating portion 2 comprises a prismatic magnetic cover 25 formed of a magnetic material such as iron. In an interior of the magnetic cover 25, the solenoid operating portion 2 has a hollow bobbin 27 made of a non-magnetic material and around which an exciting coil 26 is wound, a magnetic plate 28 made of a magnetic material and provided between one end of the bobbin 27 and the valve body 8, an inner bore 29 extending through the bobbin 27 and the magnetic plate 28, and a fixed iron core 30 and a movable iron core 31 made of a magnetic material and provided in the interior of the inner bore 29 to magnetically adhere to each other. The magnetic plate 28 is magnetically associated with the magnetic cover 25 by making an outer circumference thereof abut on an inner surface of the magnetic cover 25.

Figure 3:
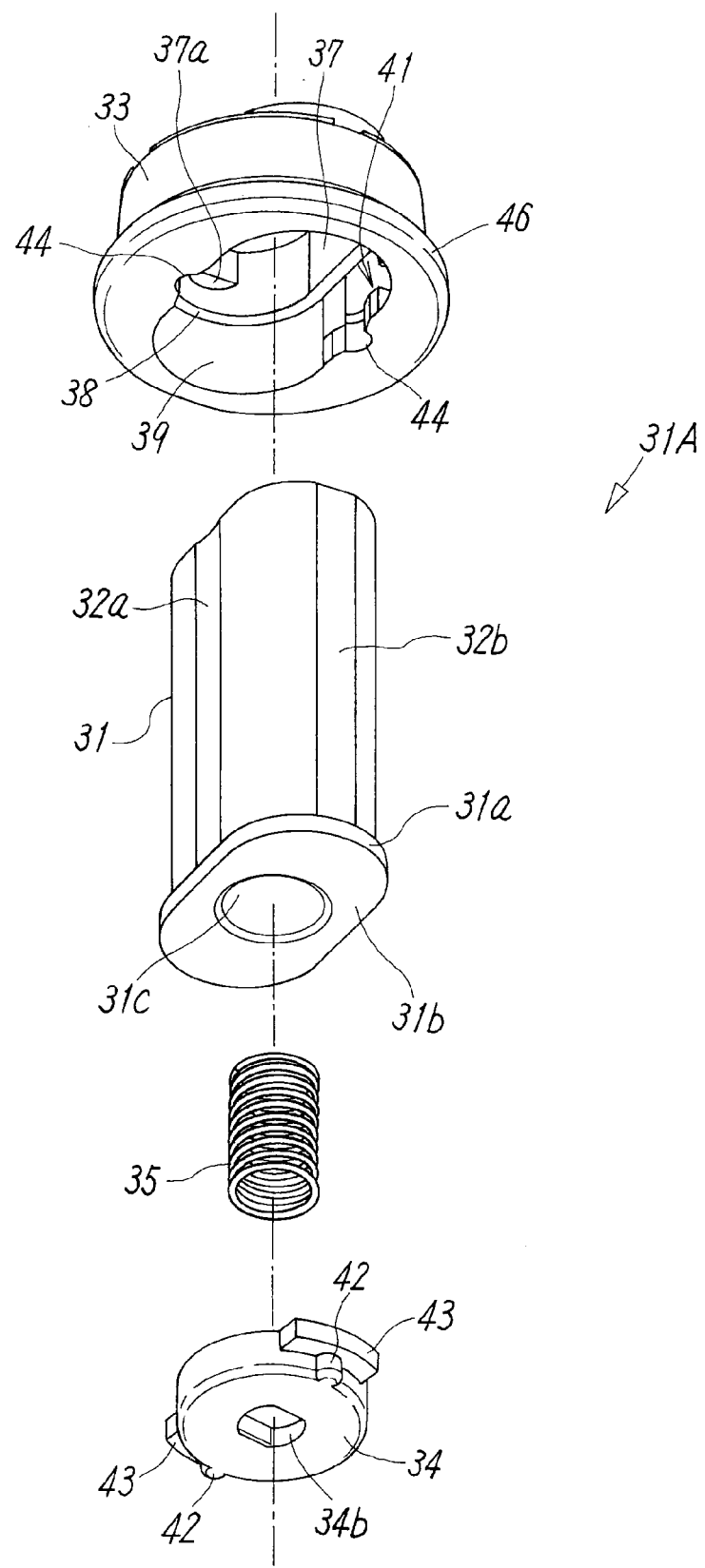
FIG. 3 is an exploded perspective view of a movable iron core assembly.

As exemplarily shown in FIG. 3 with respect to the movable iron core 31, the fixed iron core 30 and the movable iron core 31 have an oval cross-sectional shape that looks like a circle stretched in both left and right directions, or two circles connected with two parallel sides that touch the edges of the circles. On side surfaces of the fixed iron core 30 and the movable iron core 31, shallowly rounded grooves 32a are formed at minor axially opposite positions, and flat portions 32b that have flat surfaces are formed at major axially opposite positions. Also, at one ends of the iron cores 30 and 31 in an axial direction, oval flange portions 30a and 31a are formed, respectively. The fixed iron core 30 and the movable iron core 31 are arranged in the interior of the oval inner bore 29 that extends through the bobbin 27 and the magnetic plate 28 such that the other ends thereof, where the flange portions 30a and 31a are not formed, face each other. Note that, in the present invention, the term "oval" includes an ellipse and similar shapes.

The fixed iron core 30 is fixedly arranged in the interior of the inner bore 29 by fitting the flange portion 30a into a concave portion 27a of the bobbin 27 and clamping it between the bobbin 27 and an end wall portion 25a of the magnetic cover 25. The fixed iron core is also magnetically associated with the magnetic cover 25 by abutting on the end wall 25a with the flange portion 30a.

On the other hand, the movable iron core 31 is arranged in the interior of the inner bore 29 along the valve axis L so as to be movable, the leading end thereof at which the flange 31a is formed extending into the interior of the iron core chamber 21. At this leading end of the movable iron core 31, a cap 33 and a pressing member 34 are mounted with a cushioning spring 35 being provided between the pressing member 34 and the movable iron core 31. With the movable iron core 31, the cap 33, the pressing member 34, and the cushioning spring 35, a movable iron core assembly 31A is formed.

The cap 33 is a short columnar hollow member and has an oval-shaped iron core fitting bore 37 into which the movable iron core 31 fits, an oval-shaped iron core locking portion 38 at which the flange portion 31a of the movable iron core 31 is locked, and an oval-shaped pressing member housing 39 in which the pressing member 34 is housed, concentrically formed at the interior thereof in this order from the trailing end thereof to the leading end thereof. As shown in FIG. 3, the cap 33 is mounted on the movable iron core 31 by fitting the cap 33 from a trailing end side of the movable iron core 31. Since the flange portion 31a of the movable iron core 31 is locked at the iron core locking portion 38 from a leading surface side of the cap 33, the cap 33 is mounted to the movable iron core 31 such that the forward movement thereof is restricted. The backward movement of the cap 33 relative to the movable iron core 31 is freely possible.

The cap 33 may, however, be mounted on the movable iron core 31 such that the backward movement thereof is also restricted. In other words, the cap 33 may be fixedly mounted on the movable iron core 31. The cap 33 may also be formed in an oval shape.

The reference character 37a in FIG. 3 denotes a projection formed on an inner wall of the iron core fitting bore 37 for abutting on the flat portion 32b of the movable iron core 31 to stably support the movable iron core 31.

At an outer circumference of the leading end of the cap 33, a flange-like spring seat 46 is formed. Between the spring seat 46 and the magnetic plate 28 that is a member fixed to the valve body 8, an iron core return spring 47 is provided. The iron core return spring 47 biases the movable iron core 31 via the cap 33 in a direction in which the movable iron core 31 detaches from the fixed iron core 30.

In the pressing member housing 39 of the cap 33, the pressing member 34 is housed so as to be displaceable between a position at which it abuts on abutting seat surfaces 41 formed at a leading end portion of the cap 33 and a position at which it abuts on a reading end surface 31b of the movable iron core 31. Between a concave portion 34a formed on the pressing member 34 and a bottom of spring housing bore 31c formed on the movable iron core 31, a cushioning spring 35 that biases the pressing member 34 and the movable iron core 31 in mutually detaching directions is provided. If the concave portion 34a is deep enough to house the cushioning spring 35, the spring housing bore 31c may not be needed.

The pressing member 34 is formed in a disk-like shape whose length in an axial direction is smaller than that of the cap 33, and whose diameter is smaller than a minor axial bore diameter of the oval-shaped pressing member housing 39. At diametrically opposite positions on the side surface of the pressing member 34, rotation-preventing projections 42 and abutting shoulders 43 are formed such that they occupy one half each of the axial length of the pressing member 34. The rotation-preventing projections 42 are formed in a half-columnar shape and axially extend from the leading half portion of the side surface of the pressing member 34 in an axial direction. The abutting shoulders 43 are formed in an arc shape and circumferentially extend from the trailing half portion of the side surface of the pressing member 34 in an axial direction.

On the other hand, at the leading end of the cap 33, semicircular-shaped engaging grooves 44 into which the rotation-preventing projections 42 of the pressing member 34 engage are formed at minor-axially opposing positions on a bore wall of the pressing member housing 39. Also, the abutting seat surfaces 41 on which the abutting shoulders 42 abut and are locked are formed on an inner bottom surface of the bore wall.

Mounting of the pressing member 34 on the cap 33 is performed as follows: the pressing member 34 is placed such that the rotation-preventing projections 42 and the abutting shoulders 43 face each other in a major axial direction of the pressing member housing 39 (see FIG. 3), and the pressing member 34 is inserted into an interior of the pressing member housing 39 with the cushioning spring 35 being provided between the pressing member 34 and the movable iron core 31. Then, a tool is inserted into a tool bore 34b and the pressing member 34 is rotated around the axis by 90 degrees so as to engage the rotation-preventing projections 42 with the engaging grooves 44. By doing so, the pressing member 34 is arranged between the cap 33 and the movable iron core 31 with the cushioning spring 35 being compressed.

At this point, biasing forces F1, F2, and F3 of the iron core return spring 47, the cushioning spring 35, and the valve return spring 19 are related to each other so as to be F1>F2>F3.

Also, as shown in FIG. 1 and FIG. 2, when the exciting coil 26 is not energized and the movable iron core 31 is pushed by the iron core spring 47 to occupy an initial position (a valve-closing position) at which it is detached from the fixed iron core 30, the pressing member 34 presses the valve member 5 against the supply valve seat 3 via the pushrods 20. At this point, gaps x and y exist between the pressing member 34 and the leading end surface 31b of the movable iron core 31 and between the pressing member 34 and the abutting seat surfaces 41 of the cap 33, respectively.

In the solenoid valve having the above configuration, when the exciting coil 26 is not energized, the movable iron core assembly 31A occupies the initial position at which the movable iron core 31 is detached from the fixed iron core 30 by the biasing force of the iron core return spring 47 acting on via the cap 33, as shown in FIG. 1 and FIG. 2. At this point, since the pressing member 34 abuts on the pushrods 20 and presses the pushrods 20 against the biasing force of the valve return spring 19, the valve member 5 is detached from the exhaust valve seat 4 to open the exhaust flow path 14 as well as pressed against the supply valve seat 3 to close the supply flow path 13. Therefore, the output port A and the exhaust port R communicate with each other via the valve chamber 9.

Also, since the relation F1>F2>F3 is established between the biasing forces F1, F2, and F3 of the iron core return spring 47, the cushioning spring 35, and the valve return spring 19, the cushioning spring 35 is compressed between the movable iron core 31 and the pressing member 34, and the gaps x and y exist between the leading end surface 31b of the movable iron core 31 and the pressing member 34 and between the pressing member 34 and the abutting seat surfaces 33 of the cap 33, respectively.

Figure 4:
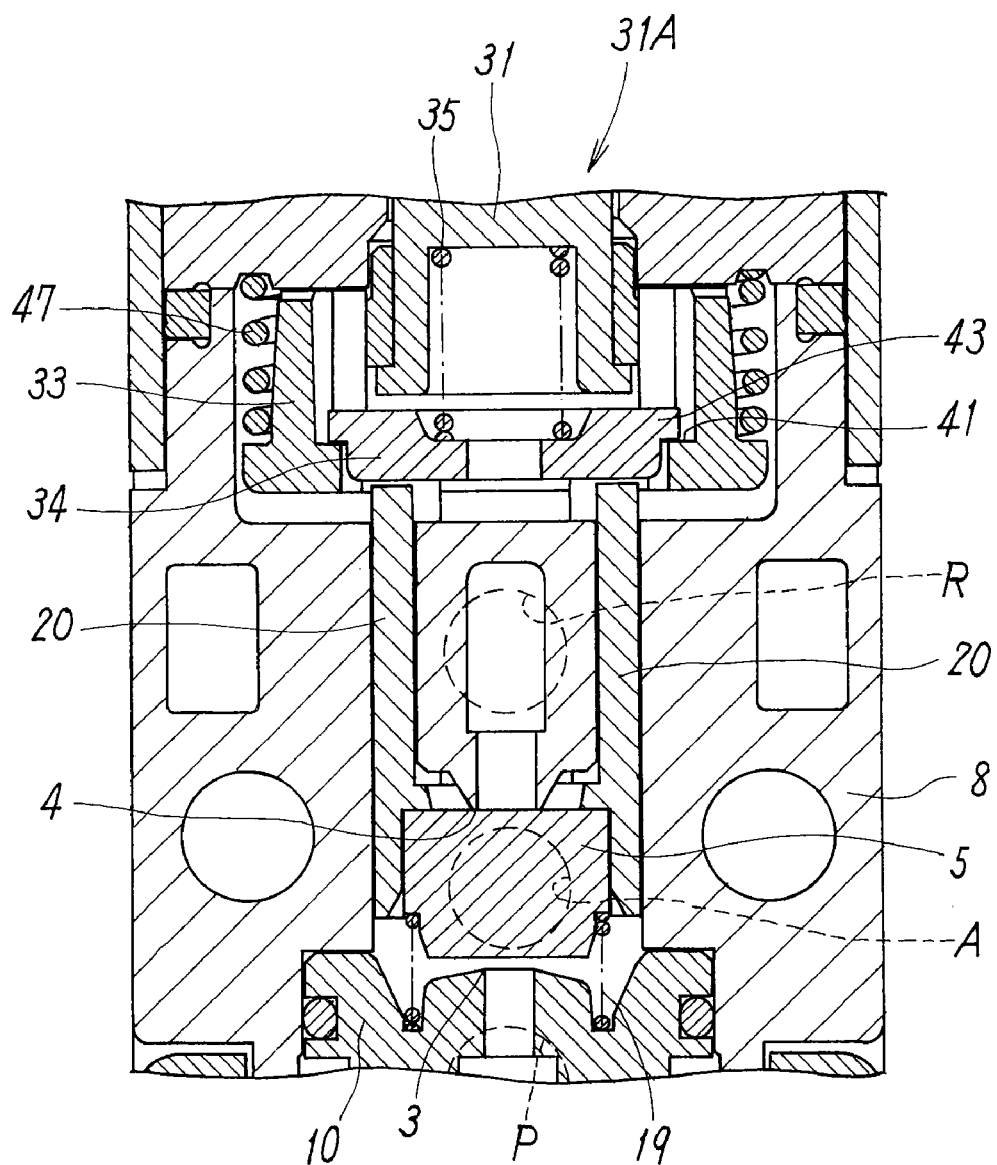
FIG. 4 is an enlarged view of the essential parts of FIG. 1 showing a different operating state.

If the exciting coil 26 is energized in this state, since the movable iron core 31 adheres to the fixed iron core 30, the movable iron core assembly 31A moves to a working position (a valve-opening position) while compressing the iron core return spring 47 by the cap 33 that is engaged with the movable iron core 31, as shown in FIG. 4. As the cap 33 moves, when the gap between the abutting seat surfaces 41 and the abutting shoulders 43 becomes zero, the cap 33 engages with the pressing member 34 and moves the pressing member 34 along therewith to the working position.

When the movable iron core assembly 31A is moved to the working position, since the pressing force of the pressing member 34 no longer acts on the pushrods 20, the valve member 5 is detached from the valve seat 3 by the biasing force of the valve return spring 19 to open the supply flow path 13, as well as pressed against the exhaust valve seat 4 to close the exhaust flow path 14. Thus, the supply port P and the output port A communicate with each other, and the exhaust port R is shut off from the output port A. Also, a small gap exists between the pressing member 34 and the pushrods 20.

It should be noted that when the exciting coil 26 is energized and the movable iron core 31 starts an adhering behavior, the cushioning spring 35 being compressed presses the movable iron core 31 toward the fixed iron core 31 to assist the adhering operation, resulting in quick and easy initial movement of the movable iron core 31 as well as improved responsivity.

If the exciting coil 26 is switched from an energizing state to a non-energizing state, the movable iron core assembly 31A is shifted to the initial position by the biasing force of the iron core return spring 47. In that occasion, since an acting force of the movable iron core 31 acts on the pressing member 34 via the cushioning spring 35 and makes the pressing member 34 abut on the pushrods 20 to press the pushrods 20, the valve member 5 detaches from the exhaust valve seat 4 and abuts on the supply valve seat 3 to open the exhaust flow path 14 as well as close the supply flow path 13. At this point, although the pressing member 34 stops at a position at which the valve member 5 abuts on the supply valve seat 3 since the pressing member 34 abuts on the pushrods 20, the movable iron core 31 continues moving by an inertia force and stops at a position shown in FIG. 1 and FIG. 2 at which the cushioning spring 35 is compressed. The gap y is then formed between the abutting shoulders 43 of the pressing member 34 and the abutting seat surfaces 41 of the cap 33.

Thus, when the energization to the exciting coil 26 is turned off and the valve member 5 abuts on the supply valve seat 3, the inertia force of the movable iron core 31 is absorbed by compressing the cushioning spring 35 and softly acts on the pressing member 34 and the pushrods 20. Therefore, the valve member 5 does not hit the valve seat 3 hard by the inertia force of the movable iron core 31, and the pressing member 34 does not abut on the pushrods 20 with high impact, resulting in reduced wear and increased durability of the valve member 5 and the pushrods 20.

Although cross-sectional shapes of the fixed iron core 30 and the movable iron core 31 are oval in the embodiment shown, these cross-sectional shapes may be circular. In that case, it is needless to say that members and their shapes that are related to the fixed iron core 30 and the movable iron core 31, such as the inner bore 29 extending through the bobbin 27 and the magnetic plate 28 and the iron core fitting bore 37 and the iron core locking portion 38 of the cap 33, are formed in a circular shape as well.

Also, although the embodiment shown depicts a three-port solenoid valve, the invention may be applied to a solenoid valve with a different number of ports, such as a two-port solenoid valve and a four-port solenoid valve.

The invention claimed is:

1. A solenoid valve constructed by arranging, along a valve axis, a fixed iron core and a movable iron core assembly that adhere to each other by a magnetic force generated by energizing an exciting coil, a valve seat formed in a flow path, a valve member for opening and closing the flow path by detaching from and attaching to the valve seat with an action of the movable iron core assembly, and a transmission member for transmitting an acting force of the movable iron core assembly to the valve member, the movable iron core assembly comprising a movable iron core that adheres to the fixed iron core, a hollow cap mounted on a leading end of the movable iron core such that a forward movement thereof relative to the movable iron core is restricted, and a pressing member that fits into an interior of the cap so as to be displaceable between a position at which it abuts on the cap and a position at which it abuts on the movable iron core and operate so as to press the valve member against the valve seat via the transmission member, the movable iron core having a flange portion at an outer circumference of a leading end thereof for locking, the cap having an iron core fitting bore into which the movable iron core fits, an iron core locking portion at which the flange portion of the movable iron core is locked, a pressing member housing in which the pressing member is housed, and abutting seat surfaces formed on the pressure member housing on which the pressing member abuts, in an interior thereof, and a spring seat for the iron core return spring, at an outer circumference of a leading end thereof, and the cap being biased by an iron core return spring in a direction in which the movable iron core detaches from the fixed iron core, the pressing member being disk-shaped and having abutting shoulders for abutting on the abutting seat surface, the movable iron core and the pressing member being biased by a cushioning spring provided therebetween in directions in which the movable iron core and the pressing member detach from each other, the valve member being biased by a valve return spring in a direction in which it detaches from the valve seat, biasing forces F1 F2, and F3 of the iron return spring, the cushioning spring, and the valve return spring being related to each other so as to be F1>F2>F3, and the solenoid valve being constructed such that when the movable iron core assembly occupies an initial position by a biasing force of the iron core return spring and the pressing member presses the valve member against the valve seat via the transmission member while the exciting coil is not energized, gaps x and y exist between the pressing member and the movable iron core and between the pressing member and the cap, respectively.

2. The solenoid valve according to claim 1, wherein projections and engaging grooves that engage each other to provide a rotation-preventing function are formed on a side surface of the pressing member and a bore wall of the cap, respectively.

3. The solenoid valve according to claim 1, wherein the pressing member housing of the cap is oval-shaped, the abutting seat surfaces being formed at minor axially opposing positions on a sidewall of the pressing member housing, the pressing member being formed such that a diameter thereof is shorter than a minor axial bore diameter of the pressing member housing, and the abutting shoulders being formed at diametrically opposite positions on the pressing member.

* * * * *